United States Patent [19]

Harrison et al.

[11] Patent Number: 5,231,982
[45] Date of Patent: Aug. 3, 1993

[54] MOLDED NOSECUP VALVE ASSEMBLY

[75] Inventors: Brian H. Harrison, Nepean; Ronald E. Davis, Kanata, both of Canada

[73] Assignee: Her Majesty the Queen in right of Canada, Ottawa, Canada

[21] Appl. No.: 784,405

[22] PCT Filed: Jul. 11, 1990

[86] PCT No.: PCT/CA90/00216

§ 371 Date: Dec. 20, 1991

§ 102(e) Date: Dec. 20, 1991

[87] PCT Pub. No.: WO91/01159

PCT Pub. Date: Feb. 7, 1991

[30] Foreign Application Priority Data

Jul. 18, 1989 [CA] Canada .................. 605984

[51] Int. Cl.⁵ .............................. A62B 18/10
[52] U.S. Cl. ........................ 128/207.12; 128/206.12; 128/201.28; 128/206.28; 261/157; 137/854; 137/908
[58] Field of Search ............... 261/157; 137/854, 908; 128/207.12, 206.12, 201.23, 201.25, 201.28, 206.28

[56] References Cited

U.S. PATENT DOCUMENTS

| | | | |
|---|---|---|---|
| 2,051,023 | 8/1936 | Bullard | 128/206.21 |
| 3,085,591 | 4/1963 | Schneider | 137/859 |
| 3,193,624 | 7/1965 | Webb | 128/207.12 X |
| 3,403,696 | 10/1968 | Pynchon | 137/854 X |
| 4,414,973 | 11/1983 | Matheson | 137/854 X |
| 4,549,543 | 10/1985 | Moon | 128/206.12 |
| 4,832,017 | 5/1989 | Schnoor | 128/206.12 |
| 4,926,855 | 5/1990 | Hellqvist | 128/201.28 |
| 4,957,106 | 9/1990 | Vanderputte | 128/201.19 |
| 4,958,633 | 9/1990 | Angell | 128/201.19 |

FOREIGN PATENT DOCUMENTS

| | | | |
|---|---|---|---|
| 638598 | 2/1964 | Belgium | 128/207.12 |
| 58022 | 2/1939 | Denmark | 128/207.12 |
| 0182550 | 5/1986 | European Pat. Off. | |
| 252052 | 1/1988 | European Pat. Off. | 128/207.12 |
| 1077065 | 3/1960 | Fed. Rep. of Germany | 128/207.12 |
| 1902917 | 8/1970 | Fed. Rep. of Germany | 128/207.12 |
| 3012094 | 10/1981 | Fed. Rep. of Germany | 128/201.28 |
| 2042689 | 9/1980 | United Kingdom | 137/854 |

Primary Examiner—Edgar S. Burr
Assistant Examiner—Eric P. Raciti
Attorney, Agent, or Firm—Nixon & Vanderhye

[57] ABSTRACT

In a gas mask, a flexible nosecup is used to prevent humid air that is exhaled from contacting the eye pieces of the mask. The nosecup is equipped with a one-way valve to allow fresh air into the nosecup. The conventional rigid valve body attached to the nosecup is replaced with a valve body molded integrally with the material of the nosecup and a valving element with a concave disk, having its rim seated on the annular valve seat of the valve body. The concave valving element accommodates any flexing of the valve body without losing the seal.

3 Claims, 2 Drawing Sheets

MOLDED NOSECUP VALVE ASSEMBLY

FIELD OF THE PRESENT INVENTION

The present invention relates to gas masks and more particularly to the one-way valves used in the nosecups of gas masks.

BACKGROUND

In a gas mask, a nosecup is used to prevent humid air that is exhaled from contacting the eye pieces of the mask and causing fogging problems. A one-way valve is required in the nosecup to allow fresh air in. Current gas masks use a rigid metal valve body crimped onto a hole in the nosecup or a rigid plastic valve body glued into place in a hole in the nosecup. Even if the valve seat is molded with the nosecup, the seat is still made in a rigid form. The valving element used is also a flat, resilient disk which seals by covering the valve seat.

An example of the known prior art is shown in U.S. Pat. No. 2,051,023 which issued on Aug. 18, 1936, to E. W. Bullard. Bullard's valve consists of a valve seat which is molded with the facepiece. However the seat is held in a rigid shape by the use of a metal ring which is embedded within the seat. The valving element is a flat resilient disk which is lightly held on the valve seat mainly by inhalation by the wearer. The present invention aims at the provision of a valve that is simpler and less expensive to produce.

SUMMARY

According to the present invention there is provided a valve for a flexible nosecup of a gas mask, said valve comprising a valve body molded integrally with the nosecup and including a peripheral valve seat substantially thicker than the nosecup, a resilient valving element with a concave configuration and a rim engaging the peripheral seat, and valve mounting means mounting the valving element on the valve seat, and resiliently deforming a centre portion of the valving element towards the valve seat.

By using an integrally molded valve body, the number of parts and cost of production of the valves are significantly reduced. The rubber valve body is configured such that it is relatively rigid compared to the thin wall of the nosecup. Consequently, distortions of the nosecup when it is worn on the face will result primarily in a deflection or distortion of the thin wall of the nosecup itself rather than of the valve body. In the event that the valve body is flexed slightly, the distortion is accommodated by the concave, resiliently deformed valving element without losing the sealing capability of the valve on the valve body.

BRIEF DESCRIPTION OF THE DRAWINGS

In the accompanying drawings, which illustrate a prior art of the valve in an exemplary embodiment of the present invention.

DETAILED DESCRIPTION

Figure 1:
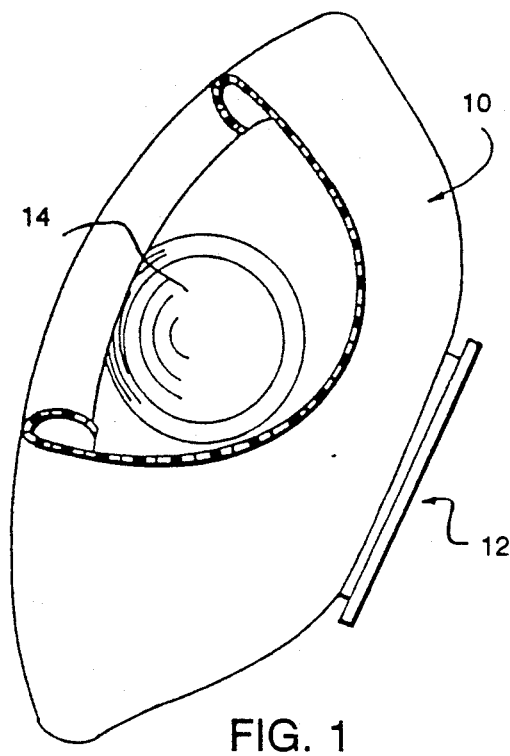
FIG. 1 is a side elevation of a gas mask nosecup, partially broken away to show the valve.
Figure 4:
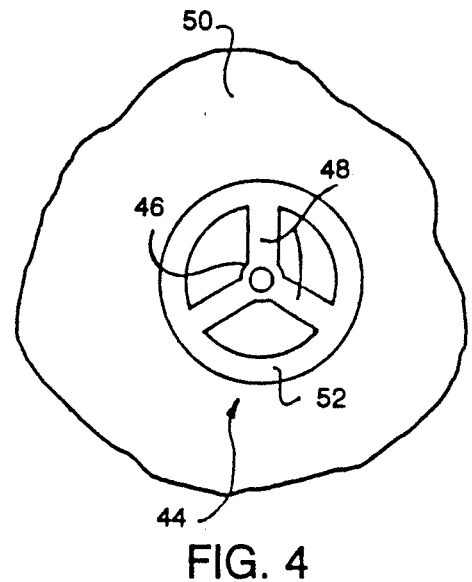
FIG. 4 is a front elevation of a valve body according to the present invention.

Referring to the accompanying drawings, FIG. 1 illustrates a nosecup 10 that is, in use, located within and assembled to a gas mask face piece. The nosecup has an exhaust opening 12 and an inlet valve 14.

Figure 2:
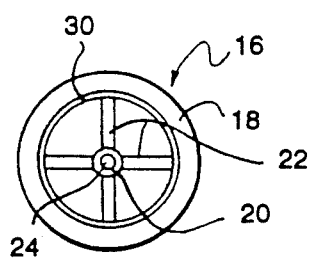
FIG. 2 is a front elevation of a prior art valve body.
Figure 3:
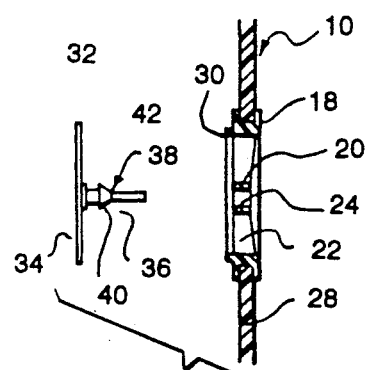
FIG. 3 is a cross-section of a prior art valve.
Figure 5:
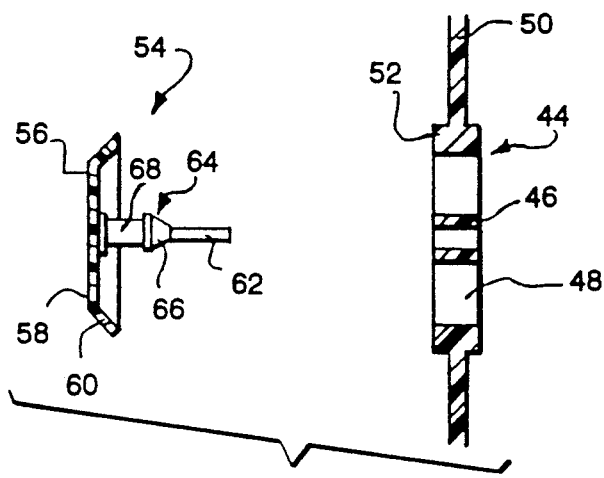
FIG. 5 is a sectional, exploded view of a valve according to the present invention.

A typical prior art inlet valve 14 is illustrated in FIGS. 2 and 3. The valve consists of a rigid thermoplastic valve body 16 in the form of an annular channel 18. Located centrally within the body 16 is a hub 20 joined to the channel 18 by four spokes 22. The hub 20 is in the form of a collar with a central bore 24. The nosecup is made from a flexible sheet rubber 28. It is made with a hole into which the valve body 16 fits, with the edge of the hole seated in the annular channel 18 and secured to the valve body by an appropriate adhesive (not illustrated).

On the inner side of the annular channel 18 is an annular rib 30 that serves as a valve seat for a valving element 32. The valving element includes a flat, resilient disk 34 and a stem 36 projecting from the centre of the disk. Part way along its length, the stem has a head 38 with a tapered leading face 40. Between the head and the disk, the stem has a seat 42 of smaller diameter than the maximum diameter of the tapered face 40. The valving element is installed on the valve body by pressing the stem through the bore 24 through the hub 20, resiliently compressing the head 38 until it has passed through the hub and has expanded on the opposite side.

In use, air may pass from the outside of the nosecup, between the seat 30 and the resilient disk 34, when the wearer inhales. On exhalation, the disk 34 is forced against the seat 30 to prevent moist air from passing from the noseup into the facepiece.

The prior art valve with a metal body is similar to that illustrated in FIGS. 2 and 3, but with the metal body crimped onto the flexible sheet material 28 of the nosecup.

An embodiment of the present invention is illustrated in FIGS. 4 through 8. As shown more particularly in FIGS. 4 and 5, the valve of the present invention includes an annular valve body 44 of molded rubber material with a central hub 46 joined to the valve body by three spokes 48. The valve body 44 is integrally molded with the flexible sheet material 50 of the nosecup, but it is significantly thicker than the material 50 so as to be substantially more rigid. One side of the valve body 44 provides an annular valve seat 52 for engagement with a valving element 54.

The valving element 54 has a concave head 56 with a flat, circular central panel 58 surrounded by an annular rim 60 flaring from the periphery of the centre panel 58 towards the valve seat 52. A stem 62 projects from the centre of the panel 58. It includes a head 64 with a tapered face 66 and a seat 68, all of which correspond to the comparable components of the stem of the prior art valve.

Figure 6:
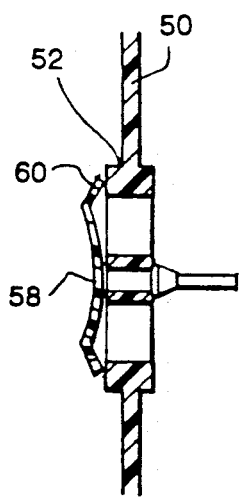
FIG. 6 is a sectional view of the valve of FIG. 5.
Figure 7:
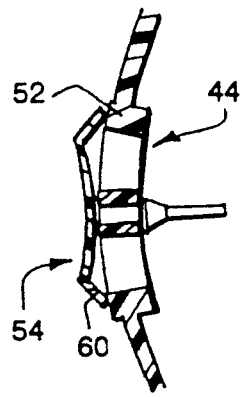
FIG. 7 is a view like FIG. 6 with the valve body flexed.
Figure 8:
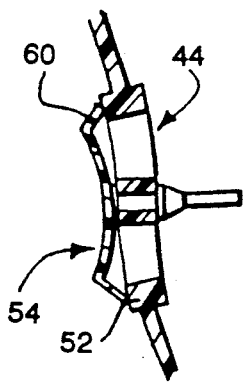
FIG. 8 is a view like FIG. 7 with the valve body flexed in a double curve.

The assembled condition of the valve is illustrated in FIGS. 6, 7 and 8. As shown in FIG. 6, when the valve is assembled, the center panel 58 is deformed to a dished or concave shape by the engagement of the edge of rim 60 with the valve seat 52. This provides a biasing force engaging the valving element on the valve seat.

As discussed in the foregoing, the flexible sheet material 50 on the nosecup is considerably more flexible than the valve body 44 with its thicker cross-section. Consequently, most flexing of the nosecup will occur in the material 50 because it is the main body of the nosecup. However, it is possible that the rubber valve body will deform as illustrated in FIGS. 7 and 8. In that case, the pre-stress induced in the valving element 54 by the dishing of the centre panel 58 will bias the rim 60 towards the valve body 44 and keep the edge of the rim 60 in sealing contact with the valve seat 52. FIG. 7 illustrates a situation where the valve body 44 is bowed away from the valving element 54, while FIG. 8 illustrates an arrangement where the valve body 44 has a double curvature. As shown, in both cases, the rim 60 remains in sealing contact with the valve seat 52.

While one embodiment of the present invention has been described in the foregoing, it to be understood that other embodiments are possible within the scope of the invention. The invention is to be considered limited solely by the scope of the appended claims.

We claim:

1. A valve for a flexible nosecup of a gas mask comprising a resiliently deformable valve seat molded integrally with the nosecup, the valve seat being of substantially thicker material than the nosecup, substantially circular, and having a central hub with an aperture therethrough; a resilient valving element with a circular central panel and a stem extending at one side from the centre of the panel; and a plurality of spokes radially extending from the central hub to said valve seat to form apertures between adjacent spokes from one side of the valve body to the other, charaterised by a rim surrounding the central panel and projecting therefrom on the same side of the central panel from which the stem extends, such that when the valve is assembled with the stem through the aperture in the central hub and the valve is closed, the central panel will become concave in a direction away from said seat to resiliently bias the edge of the rim into forceable contact with the valve seat to maintain the valve closed in response to deformation of the resilient deformable valve seat.

2. The valve of claim 1, wherein the central panel (58) is substantially flat before assembly.

3. The valve of claim 1, wherein the stem (62) has a head (64) and a tapered face (66) to lock the valving element (54) in place in assembled condition.

* * * * *